United States Patent [19]
Ahmed et al.

[11] Patent Number: 5,831,802
[45] Date of Patent: Nov. 3, 1998

[54] ELECTRONIC CIRCUIT FOR AUTOMATIC DISCONNECTOR

[76] Inventors: Samir Omar Ramsey Ahmed, P.O. Box 759, 512 Easton Rd., Riegelsville, Pa. 18077; Adel Abdel Aziz Ahmed, 160 Ridgeview Cir., Princeton, N.J. 08540

[21] Appl. No.: 665,381

[22] Filed: Jun. 18, 1996

[51] Int. Cl.⁶ .................................................. H01H 47/28
[52] U.S. Cl. .............................. 361/1; 361/187; 307/149
[58] Field of Search ........................... 361/1, 87, 93–94, 361/98–99, 170, 187, 205; 335/6; 337/198; 174/53; 307/125–126, 131, 135, 137, 139, 141, 149; 200/51 R; 439/152, 180, 638, 646, 650–656

[56] References Cited

U.S. PATENT DOCUMENTS

| | | | |
|---|---|---|---|
| 2,427,390 | 9/1947 | Dear | 200/115.5 |
| 3,475,715 | 10/1969 | Venalek | 339/45 |
| 3,936,123 | 2/1976 | Gossett et al. | 439/155 |
| 4,045,106 | 8/1977 | Borg | 439/152 |
| 4,118,690 | 10/1978 | Paynton | 340/656 |
| 4,157,855 | 6/1979 | Chan | 439/155 |
| 4,314,735 | 2/1982 | Fullenkamp | 439/152 |
| 4,508,404 | 4/1985 | Frawley | 439/153 |
| 4,586,768 | 5/1986 | Eck | 439/160 |
| 4,778,400 | 10/1988 | Jacobs | 439/152 |
| 4,850,886 | 7/1989 | Berks | 439/182 |
| 5,083,042 | 1/1992 | Merchant | 307/149 |
| 5,211,569 | 5/1993 | Havens | 439/159 |
| 5,266,040 | 11/1993 | Merrill et al. | 439/159 |
| 5,293,296 | 3/1994 | Carl | 361/93 |
| 5,453,899 | 9/1995 | Page | 361/1 |
| 5,645,439 | 7/1997 | Nugent, Jr. et al. | 439/159 |

FOREIGN PATENT DOCUMENTS 0 344 850  12/1989  European Pat. Off. .........  H02H 3/16

Primary Examiner—Jeffrey A. Gaffin
Assistant Examiner—Michael Sherry

[57] ABSTRACT

An electronic circuit arrangement automatically provides an energizing current to a solenoid for ejecting a plug from an outlet coupled to a source of supply voltage upon substantial cessation of current flow being drawn by an appliance by way of the plug while the supply voltage is present. The energizing current is controlled by a controlled switching device. An optional keyed plug is utilizable for selectively enabling operation of the solenoid.

40 Claims, 4 Drawing Sheets

ELECTRONIC CIRCUIT FOR AUTOMATIC DISCONNECTOR

BACKGROUND OF THE INVENTION

1. Field of the Ivention

The present invention relates generally to plugs and sockets for electrical appliances and the like and, more particularly, to plugs and outlet sockets such as may be used in conjunction with an electric power cord for coupling an electrical device to a source of operating power such as the electric mains supply or it may form part of a plug-in power supply unit for providing operating power to an appliance or instrument.

1. Description of the Prior Art

An arrangement is known in the art for utilizing a spring to eject a plug from an electrical outlet, as disclosed in U.S. Pat. No. 5,211,569 issued May 18, 1993 in the name of Havens and entitled ELECTRICAL POWER CORD AND APPLIANCE USING SAME, and whereof the disclosure is herein incorporated by reference, to the extent it is not inconsistent with the present invention. An object of the aforesaid patent, as is explained in column 1, lines 40–49 thereof, is to provide an electrical power supply cord and appliance including such an electrical power supply cord wherein a self-ejecting plug is provided on the supply cord and means is provided to remotely-control ejection of the plug in a manner to save the user of the cord/appliance from having to return to the electrical outlet to disengaged the plug therefrom when the user reaches the maximum operating length of the power cord.

As explained in column 1, lines 16–39 of the aforesaid patent, typically a user begins floor polishing proximate a wall outlet and continues operation at gradually increasing distances from the wall outlet until the power supply cord reaches its maximum length. Then the user must walk back to the wall outlet, remove the power cord plug from the outlet and proceed to the next wall outlet where the power cord plug is inserted to continue operation of the appliance. This sequence is repeated until the entire work area has been treated by the appliance. Operation of the appliance in this manner is time-consuming and laborious, particularly, for example, when the entire length of a long hallway or corridor has to be polished.

The arrangement described in the afore-mentioned patent utilizes a wire coil which is energized so as to disengage an interlock and allow a spring to eject the plug from the outlet. When a button is pressed, a supply current is provided to the coil by way of a supply wire 224a. See column 6, lines 11–22 of the aforesaid patent.

U.S. Pat. No. 5,266,040, issued Nov. 30, 1993 in the names of Merrill et al., entitled RELEASABLE ELECTRIC CONNECTOR ASSEMBLY, and whereof the disclosure is herein incorporated by reference, to the extent it is not inconsistent with the present invention, discloses a release mechanism for an electrical plug for releasing the plug from a socket. The release mechanism includes a perimeter ejecting member which substantially surrounds the electrical contact prongs of the plug is moveable with respect thereto. A remote switch is energized, which activates the release mechanism and disengages the plug from the socket by sliding over the contact prongs.

An ejecting outlet and adapter is disclosed in U.S. Pat. No. 5,293,296, entitled EJECTING OUTLET AND ADAPTER, issued Mar. 8, 1994, in the name of Carl, and whereof the disclosure is herein incorporated by reference, to the extent it is not inconsistent with the present invention. An ejecting electrical outlet has magnets positioned within the electrical receptacle. Springs are positioned between the magnets and are compressed when the prongs of a plug are entered into the outlet. The strength of a magnetic field generated by an overload electric current is sufficient to defeat the attractive forces between the magnet and to permit decompression of the spring and ejection of the plug from the electrical outlet.

Related information in the art area is also provided in, for example, U.S. Pat. No. 4,778,400 issued Oct. 18, 1988 in the name of Jacobs and entitled REMOTE ELECTRICAL CONNECTOR; U.S. Pat. No. 4,508,404 issued Apr. 2, 1985 in the name of Frawley and entitled REMOTE CONNECT AND DISCONNECT ASSEMBLY WITH ENERGY 0 ISOLATION; U.S. Pat. No. 4,314,735 issued Feb. 9, 1982 in the name of Fullenkamp et al. and entitled BED LOCATOR HAVING AN INTEGRAL ELECTRIC SOCKET AND A PLUG EJECTOR; U.S. Pat. No. 4,157,855 issued Jun. 12, 1979 in the name of Chan and entitled ELECTRIC SOCKET AND PLUG; U.S. Pat. No. 4,850,886 issued Jul. 28, 1989 in the name of Berks and entitled POWER CORD DECOUPLER AND METHOD; U.S. Pat. No. 4,586,768 issued May 6, 1986 in the name of Eck and entitled ELECTRICAL CONNECTOR PLUG WITH AN INTEGRAL EJECTOR; U.S. Pat. No. 3,936,123 issued Feb. 3, 1976 in the names of Gossett et al. and entitled ELECTRICAL PLUG EJECTING APPARATUS; U.S. Pat. No. 4,045,106 issued Aug. 30, 1977 in the name of Borg and entitled AUTOMATIC ELECTRICAL PLUG RELEASE. The disclosure of the afore-listed patents is herein incorporated by reference, to the extent it is not inconsistent with the present invention.

It is apparent that the arrangement of the aforementioned U.S. Pat. No. 5,211,569, for example, disengagement of the plug from the socket requires the pressing of a button by the user. Furthermore, a special conductor is required in the line cord for supplying current to a coil or solenoid, as therein described.

SUMMARY OF THE INVENTION

It is herein recognized that, with regard to particular types of appliances, and in certain applications, it may be desirable to have the plug eject automatically from the outlet socket upon completion of use of the appliance or apparatus. Preferably, such operation should be automatic, without the need for an operator to actuate the ejection.

For example, a hair dryer of the type in common use utilizes a blower for blowing air through a heated electric element wire. When operation of the hair dryer is ended, the user may switch it off and then set it down on a table. If the switch is inadvertently operated through an accidental movement, or if a switch failure or short-circuit across the switch should occur, this will cause the hair dryer to restart. However, if the hair dryer has been set down on the air intake side for the blower, overheating may occur because of the reduced air flow and thereby create a fire hazard.

This situation may occur with other appliances utilizing heating elements, such as hot-air popcorn poppers, toasters, and the like.

It is also herein recognized that in certain other situations, it may desirable to unplug an appliance after it has been switched off. While ground fault interrupters are required in many situations where the presence of accessible good grounds presents a shock hazard, such as in bathrooms, kitchens, the outdoors, and so forth, on the one hand, many preexisting installations are not equipped with ground fault interrupters and, on the other hand, it is not considered good practice to allow exposure to a shock hazard, even with a ground fault interrupter, because it may on occasion fail to operate for any of a number of reasons. In the event that, for example, a supply line powered portable television receiver or radio receiver is operated in a bathroom, it may continue to pose a shock hazard after having been switched off, such as by tumbling into a filled bathtub.

Accordingly, it is an object of the present invention to provide improved user safety by causing an appliance plug to be automatically ejected from a wall outlet socket when the appliance operating current is switched off.

In accordance with an aspect of the invention, an electronic circuit arrangement automatically provides an energizing current to a solenoid for ejecting a plug from an outlet upon substantial cessation of current flow being drawn by an appliance by way of the plug.

In accordance with another aspect of the invention, the energizing current is controlled by a controlled switching device.

In accordance with another aspect of the invention, the electronic circuit arrangement includes sensing circuit apparatus for sensing the substantial cessation of current flow for providing a trigger signal to the controlled switching device.

In accordance with yet another aspect of the invention, the electronic circuit arrangement includes a capacitor arrangement maintaining a charge at a time when the plug is engaged with the outlet and transistor apparatus coupled between the control electrode and the capacitor and being responsive to the substantial cessation of current flow for providing the trigger signal.

In accordance with yet another aspect of the invention, the electronic circuit arrangement includes a toroidal transformer coupled to the capacitor apparatus and to the transistor apparatus.

In accordance with still yet another aspect of the invention, an arrangement for automatically disconnecting a plug from an outlet socket by use of a solenoid operating an ejector mechanism for separating the plug from the socket, includes an electronic circuit for providing an energizing current to the solenoid, the electronic circuit comprising apparatus for providing a signal voltage representative of current flow through the plug to a load connected therewith; first controllable conduction apparatus coupled in series with the solenoid and having a trigger electrode; capacitor apparatus coupled to a supply source for charging the capacitor apparatus with an operating voltage at a time when the current flow is not zero; second controllable conduction apparatus coupled between the capacitor apparatus and the trigger electrode and having a control electrode; and control circuit apparatus coupled between the apparatus for providing a signal voltage and the control electrode.

In accordance with still yet another aspect of the invention, the apparatus for providing a signal voltage comprises a toroidal transformer.

In accordance with yet another aspect of the invention, the first controllable conduction apparatus comprises an SCR or a thyristor.

In accordance with another aspect of the invention, the control circuit apparatus comprises a time constant circuit having a faster time constant than a time constant associated with the capacitor apparatus.

In accordance with a further aspect of the invention, the control circuit comprises a timing capacitor charged from the current source when the current flow is not zero, the timing capacitor discharging more rapidly than the capacitor apparatus when the current flow ceases, thereby causing a turn-on signal to be applied to the control electrode of the second controllable conduction apparatus for causing the operating voltage of the capacitor apparatus to be applied to the trigger electrode by way of the second controllable conduction apparatus.

In accordance with yet a further aspect of the invention, an electronic circuit for providing a trigger signal to a controlled conduction device upon cessation of current flow in a monitored circuit, comprises apparatus for providing a monitoring signal representative of the current flow; and apparatus for sensing the monitoring signal and for providing the trigger signal when the monitoring signal indicates a substantial cessation of the current flow.

In accordance with still yet a further aspect of the invention, the apparatus for providing a monitoring signal representative of the current flow comprises a toroidal transformer.

In accordance with still a further aspect of the invention, the apparatus for sensing the monitoring signal includes capacitor storage apparatus for providing operating power and energy for the trigger signal.

In accordance with yet another aspect of the invention, current for the trigger is obtained by way of a coupling to the monitored circuit.

In accordance with yet another aspect of the invention, an electronic circuit for controlling apparatus for unplugging a plug from an outlet socket, comprises a solenoid for operating a mechanical armature arrangement for physically separating the plug from the socket; controllable conduction apparatus for selectively energizing the solenoid; apparatus for sensing current flow to a load through the plug; and detecting apparatus coupled to the sensing apparatus for detecting a substantial cessation of the current flow and thereupon supplying a trigger signal to the controllable conduction apparatus for energizing the solenoid.

In accordance with yet another aspect of the invention, the electronic circuit includes capacitive storage apparatus for providing operating power to the detecting apparatus.

In accordance with yet another aspect of the invention, the electronic circuit includes apparatus for sensing the presence of a plug where the plug optionally exhibits a keying element, such that the detecting apparatus is disabled unless the plug does exhibit the keying element.

In accordance with yet another aspect of the invention, the keying element comprises a protuberance and the apparatus for sensing the presence comprises a switch, the switch being actuated by the protuberance upon insertion of the plug into the socket.

In accordance with yet another aspect of the invention, the detecting apparatus supplies the trigger signal after detecting a substantial cessation of the current flow independently of whether the current flow is established before, concurrently with, or after insertion of the plug into the socket.

In accordance with yet another aspect of the invention, the electronic circuit is formed, in part at least, as an integrated circuit.

In accordance with an aspect of the invention, an automatic disconnector for a plug comprises an ejector arrangement for ejecting the plug from an outlet, a sensing arrangement for sensing current flow through the plug and for sensing a substantial cessation of the current flow, and an arrangement coupling the ejector arrangement to the sensing arrangement for causing ejection of the plug upon the substantial cessation of the current flow, wherein the sensing arrangement for sensing current flow through the plug and for sensing a substantial cessation of the current flow comprises an electronic circuit. Optionally, an arrangement for sensing whether a specially adapted plug has been inserted into the outlet is included and may inhibit whether a specially adapted plug has been inserted into the outlet is coupled to the ejector arrangement for inhibiting the ejection unless the specially adapted plug has been inserted into the outlet.

BRIEF DESCRIPTION OF THE DRAWING

The invention will be more closely described in conjunction with the drawing, in which.

DESCRIPTION OF THE PREFERRED EMBODIMENTS

Figure 1:
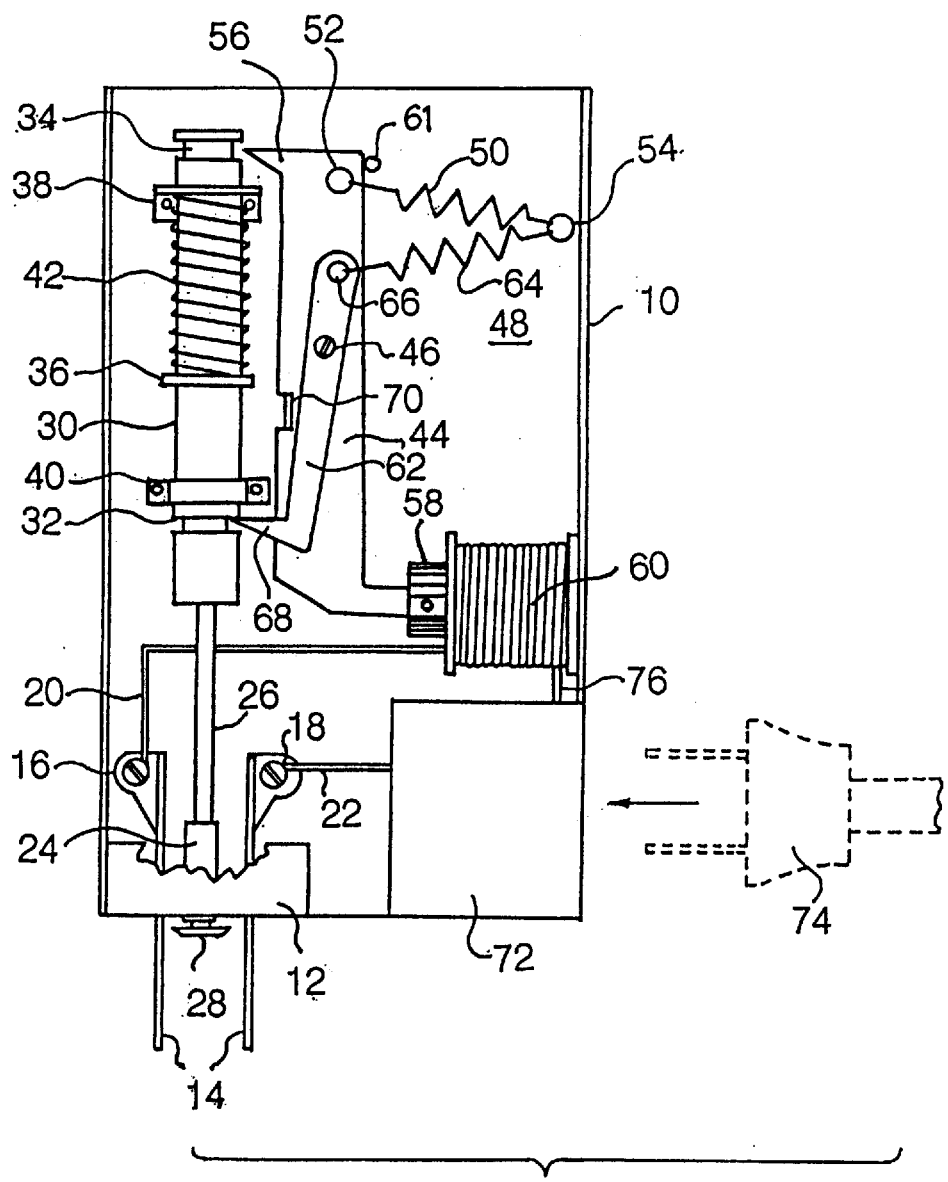
FIGS. 1, 2, and 3 show apparatus for automatically ejecting a plug.

FIG. 1 shows an exemplary embodiment of an automatic disconnector, as also described in the copending application entitled APPARATUS AND METHOD FOR AUTOMATIC DISCONNECTOR and being filed in the name of S. O. Ahmed on even date herewith and whereof the disclosure is herein incorporated by reference. The application has since been accorded Ser. No. 08/665,455. A frame or chassis 10 has mounted thereon a housing 12, shown in partial section, from which extend a pair of prongs or blades 14 for forming a standard household plug for mating cooperative engagement with a receptacle outlet, not shown, such as a wall outlet for household current. Blades 14 are secured against movement in housing 12 such as by molding or an equivalent fastening method. Respective screw terminals 16 and 18 are formed on ends of blades 14 extending into frame 10 for receiving and securing conductors 20 and 22 respectively. Housing 12 includes a tube containing a passageway for allowing slidable motion therethrough of a plunger rod or ejector 26. Plunger rod 26 carries at its one end an actuator portion 28 situated substantially between blades 14. Plunger rod 26 has a cam portion 30 of greater diameter than the portion of plunger rod 26 which carries actuator portion 28. Cam portion 28 includes a first annular recess 32 located proximate the actuator end of plunger rod 26 and a second annular recess 34 distal from the actuator end of plunger rod 26. Cam portion 28 further includes a shoulder portion 36. Cam portion 30 passes through first and second bearing straps 38 and 40 affixed to frame 10, which allow cam portion 30 to slide freely therethrough but restrain it against any translational movement. A spiral spring 42 is compressed between shoulder portion 36 and bearing strap 38 so as to urge cam portion 28, and thereby to urge plunger rod 26, to slide towards the direction of the actuator end of plunger rod 26.

A first rocker arm 44 is pivotably mounted to frame 10 by means of a pivot screw 46, such that rocker arm 44 can pivot freely in a plane parallel to the plane of a flat portion 48 of frame 10. A tension spring 50 has one end thereof attached to rocker arm 44 by way of a hole 52 and the other end attached to frame 10 by way of a hole 54. Rocker arm 44 has at one end a pawl 56 for selectively engaging recess 34. At its other end, rocker arm 44 carries an armature 58 for selective actuation by means of a solenoid winding 60. A stop pin 61 prevents rocker arm 44 from rotating further in response to the urging of spring 50.

A second rocker arm 62 is also pivotably mounted to frame 10 by means of pivot screw 46, such that rocker arm 62 can pivot freely in a further plane parallel to and close to the plane of movement of the first rocker arm 44. A tension spring 64 has one end thereof attached to 62 by way of a hole 66 and the other end attached to frame 10 by way of hole 54. Rocker arm 62 exhibits a pawl 68 for selectively engaging recess 32. First rocker arm 44 exhibits a tab or catch 70 along its edge proximate plunger rod 26 and on the same side of pivot screw 46 as pawl 68. Tab 70 is adapted to engage selectively second rocker arm 62 such that at a certain point of rotation of rocker arm 62 is constrained from further rotation relative to first rocker arm 44 so that the engagement of pawl 68 with recess 32 depends in part on the position of first rocker arm 44.

An outlet socket 72 is affixed to frame 10, for receiving a plug 74, shown in dashed outline. The contacts and leads within socket 72 are similar to such as are utilized in a conventional outlet wall socket and need not be further described. Conductor 22 connects one of blades 14 to one pole, not shown, of socket 72. The other of blades 14 is connected by way of conductor 20 to one end of solenoid 60. The other end 76 of solenoid 60 is connected to the other pole of socket 72.

In a rest position without engagement of either pawl, plunger rod 26 will be in its lowest position, that is, towards the bottom of the drawing in FIG. 1. This is because of the force exerted by spring 42.

In operation, two modes are possible. In a first mode, an automatic disconnector in accordance with the principles of the invention, as shown in the exemplary embodiment of FIG. 1 is plugged into a live outlet receptacle, such as a wall outlet, not shown, with an appliance plug already inserted into socket 72 where the appliance is switched off or with no appliance plug inserted into socket 72.

In a second mode, the automatic disconnector is plugged into a live outlet receptacle with an appliance plug already inserted into socket 72 where the appliance is switched on.

Considering the first mode, where the appliance is switched off or there is no appliance plug inserted into socket 72, when blades 14 are inserted into, for example, a wall outlet receptacle, actuator portion 28 will be pushed in towards frame 10 by the wall-plate of the wall outlet, thereby moving actuator rod 26 in an upward direction in reference to FIG. 1. With no current flowing through solenoid winding 60, rocker arm 44 will be resting against stop pin 61 under the action of spring 50. Pawl 56 cannot reach recess 34 to engage it. Because tab 70 is its maximum clockwise position due to the position of rocker arm 44, rocker arm 62 is positioned by spring 64 such that pawl 68 can engage recess 32 as plunger rod 26 is pushed in by the action of inserting blades 14 into an outlet receptacle.

Accordingly, plunger rod is latched by pawl 68 and remains in that position when the automatic disconnector has been fully inserted into a wall outlet. When current is drawn from receptacle 72, either by plugging in an appliance which is already switched on or by switching on an appliance previously plugged into receptacle 72, solenoid winding 60, which is in series circuit with the supply to receptacle 70, becomes energized by this current. Armature 58 is drawn into winding 60 by an electromagnetically generated force, thereby causing rocker arm 44 to rotate in a counter-clockwise manner about pivot screw 46. This causes pawl 56 to enter recess 34. However, the dimensions and position of recess 34 are such that no contact occurs initially between the engaging upper edge of recess 34 and pawl 56, so that the force of spring 42 continues to be resisted by pawl 68 in recess 32. Upon continuing rotation of rocker arm 44 as armature 58 continues to be drawn further into solenoid coil 60, tab 70 engages rocker arm 62, eventually causing pawl 68 to disengage from recess 32, whereupon plunger rod 26 is driven downward by the force of spring 42. However, plunger rod 26 only moves a small distance before the upper surface of recess 34 engages pawl 56 which effectively prevents any further motion of plunger rod 26. This distance moved is nevertheless sufficient to preclude pawl 68 from being able to reengage into recess 32 which has now moved too far down. Accordingly, actuator portion 28 only moves down a very small distance and the automatic disconnector remains plugged into the wall outlet.

If the appliance which was plugged into receptacle 72 is now switched off, current flow through solenoid winding 60 ceases and armature 58 is released. Spring 50 can now rotate rocker arm thereby disengaging pawl 56 from recess 34 and freeing plunger rod 26 to move downward under the action of spring 42. This causes actuator portion 28 to push against the wall-plate of the wall outlet, and thereby eject the automatic disconnector from the outlet.

The second mode of operation will next be considered, wherein the automatic disconnector is plugged into a live outlet receptacle with an appliance plug already inserted into socket 72 where the appliance is switched on.

As before, the actuator portion 28 will be pushed in by the wall-plate when the automatic disconnector is plugged into a wall outlet, thereby forcing plunger rod 26 in an upward direction, relative to the drawing. Solenoid winding 72 will be energized immediately upon insertion of blades 14 into the wall outlet and consequently, rocker arm 44 will already be in a counter clockwise position as plunger rod moves up, with pawl 56 in a position to engage into recess 34 as it moves up. The end of plunger rod 26 will displace rocker arm 44 temporarily against the solenoid action on armature 58 in a clockwise manner by sliding along the inclined lower edge of pawl 56. As recess 34 comes up into position, pawl 56 will enter recess 34 responsive to the solenoid action on armature 58. At the same, time, tab 70 will restrain rocker arm 62 such that pawl 68 cannot engage into recess 32.

When the force inserting the automatic disconnector has ceased pushing it in, spring 42 will cause actuator portion 28 to push against the wall-plate thereby tending to extract blades 14 from the wall socket. However, this only occurs for a very small distance until the top portion of recess 34 has been engaged by pawl 56, whereupon motion of actuator portion 28 ceases and the blades remain substantially inserted in the outlet. As explained above in the description of the first mode, this configuration results in recess 32 being too low for pawl 68 to enter it for engagement even if rocker arm 62 were free to move.

Upon the appliance being switched off, solenoid winding 60 will no longer be energized and spring 50 will withdraw pawl 56 from recess 34. Although rocker arm 62 is also thereby released by the movement of tab 70, recess 32 is too low to be entered by pawl 68 as has been previously explained. Thus, plunger rod 26 is released to be pushed down by the force of spring 42, thereby causing actuator portion 28 to push against the wall-plate and so force the automatic disconnector to become unplugged from the wall outlet.

Figure 2:
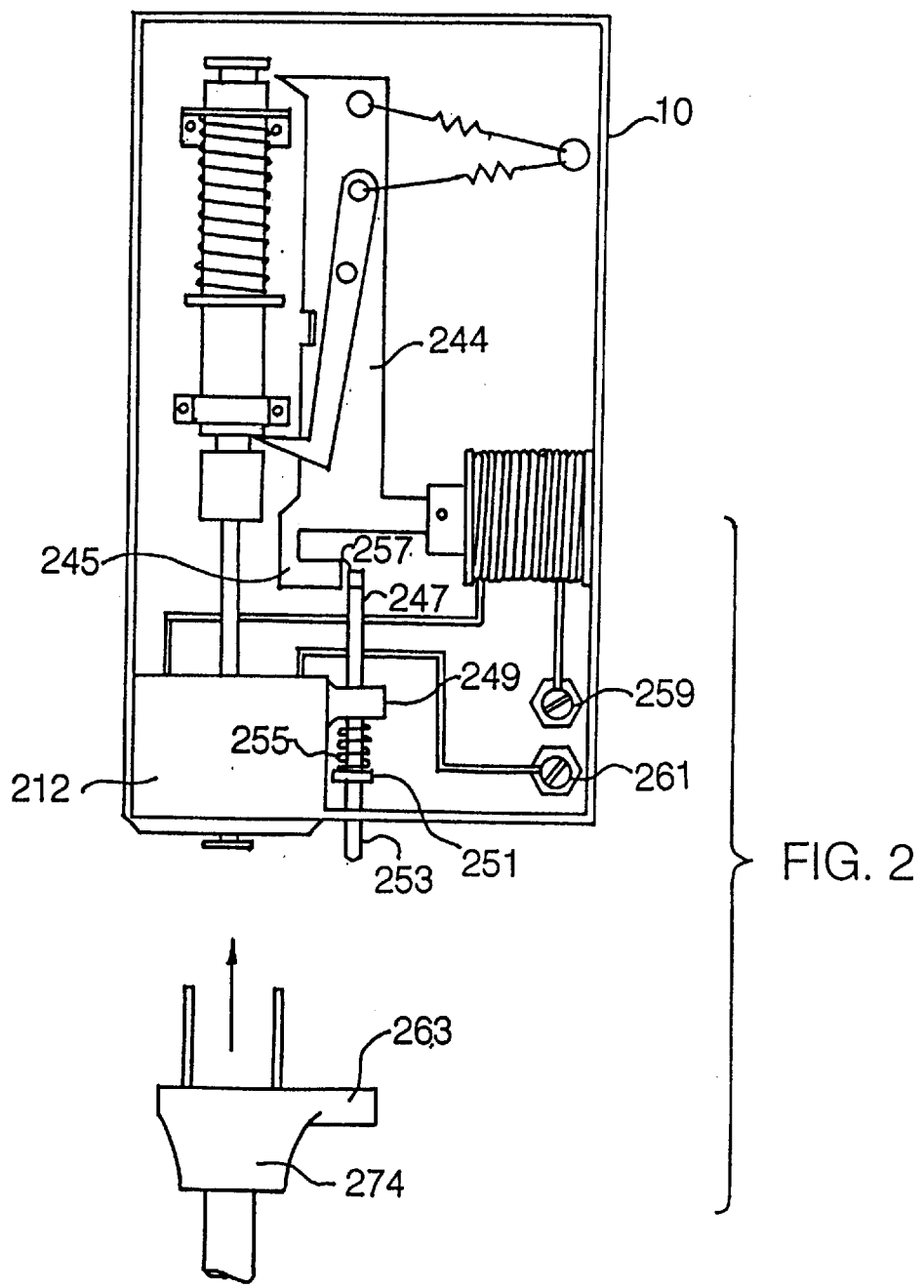

FIG. 2 shows an example wherein the automatic disconnector is included in an outlet socket so as to form an automatic disconnector outlet for ejecting a plug therefrom when an appliance or load is switched off. Like parts in FIGS. 1 and 2 are indicated by like reference numerals.

In FIG. 2, a housing 212, mounted on frame 10, includes an outlet receptacle, similar to a standard wall receptacle, for receiving a plug such as for an appliance. Various parts in the automatic disconnector outlet operate similarly to their counterparts in the FIG. 1 embodiment, with exceptions and differences to be described.

Figure 3:
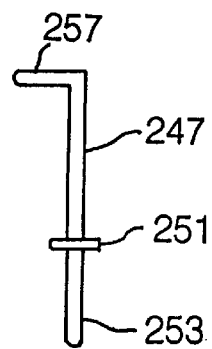

In FIG. 2, rocker arm 244 exhibits a cam portion 245 for engaging a control rod 247. Control rod 247 is of square cross-section and is slidably mounted in a square bearing hole in a boss 249 attached to housing 212. Control rod 247 exhibits a flange 251 and has one end 253 for selectively protruding from frame 10, in close proximity to the outlet socket in housing 212. A compression spring 255 biases the movement of control rod 247 for causing it normally to protrude from frame 10. As is also shown in FIG. 3, the other end of control rod 247 is bent at a right angle in a direction for forming a portion 257 thereof for selectively engaging cam portion 245. In the normal extended position of control rod 247, portion 257 prevents rocker arm 244 from moving in response solenoid 60 being energized.

One pole of the receptacle socket in housing 212 is connected to one end of solenoid winding 60 and the other pole of the receptacle socket is connected to a terminal 259 for connection to one bus of an electrical supply main. The other end of solenoid winding 60 is connected to another terminal 261 for connection to the other bus of the electric supply main. Plug 274, for providing power to an appliance is optionally equipped with a protuberance 263.

In operation, when an appliance plug not exhibiting protuberance 263 is inserted into the receptacle socket in housing 212, plunger rod 26 is pushed in and is latched by pawl 68. However, control rod 247 is not affected and movement of rocker arm 244 continues to be blocked by portion 257 of rod 247. Energization and deenergization of solenoid winding therefore have no effect and the plug remains inserted.

When an appliance plug exhibiting protuberance 263 is inserted, control rod 247 is pushed in clear of cam portion 245. Accordingly, rocker arm 244 is no longer blocked. Operation then is essentially in accordance with that described for the embodiment of FIG. 1, except that when plunger rod 26 is released, it pushes out plug 274 and itself remains part of the outlet socket.

Figure 4:
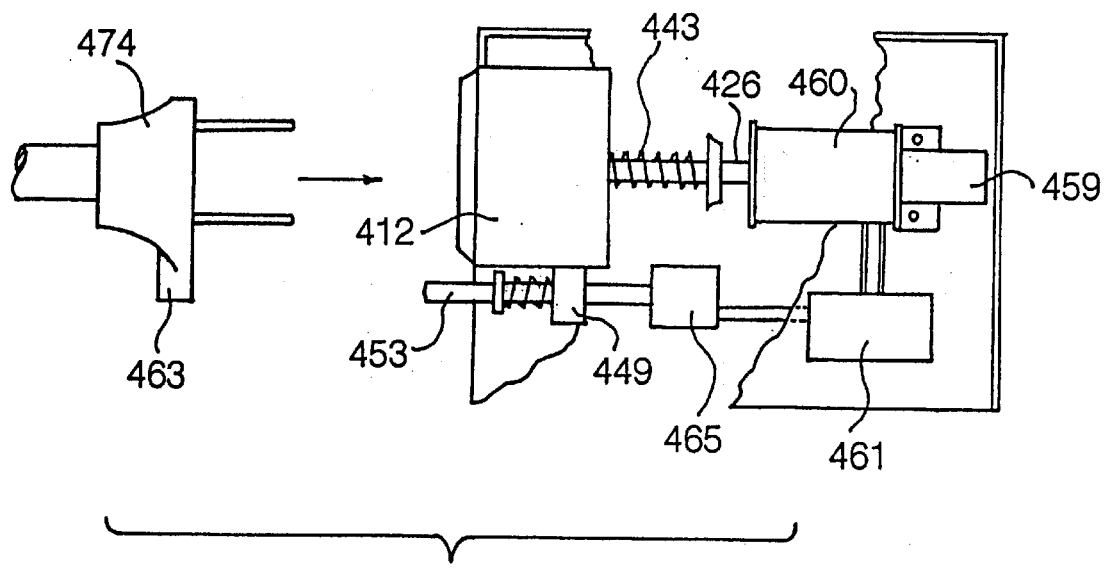
FIG. 4 shows an exemplary embodiment in accordance with the invention.

In the exemplary embodiment in accordance with the invention shown in FIG. 4, an automatic disconnector outlet includes a solenoid winding 460 operating directly on a plunger 426 by way of an armature 459 for ejecting a plug from the outlet. An electronics package 461, to be described in greater detail below, senses the cessation of current flow through the plug to an appliance and causes solenoid winding 460 to be energized. A sensing switch 465 is operable by control rod 453 for disabling the electronics package 461 from energizing solenoid winding 460 in the event a plug without a protuberance 463 is utilized so that such a plug will not be ejected. Clearly it must understood that electronics package 461 can be included in like manner in the examples of FIGS. 1 and 2 so as to form further embodiments in accordance with the invention. It should also be understood that sensing switch 465 can also be utilized in the embodiments of FIG. 1 for selectively shorting out the winding of solenoid 60 instead of using rod 257.

Figure 5:
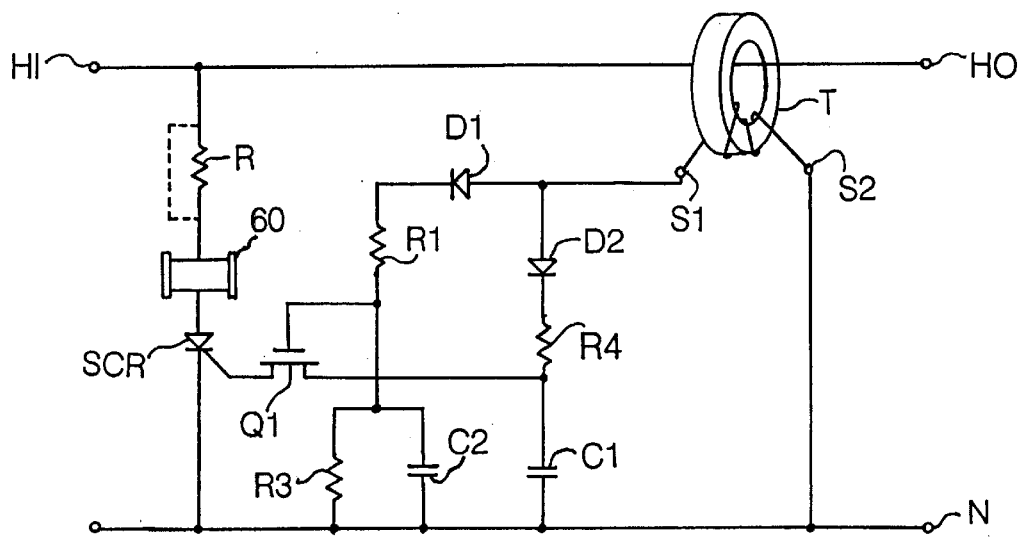
FIGS. 5 and 6 show further details relating to the embodiment of FIG. 4.

FIG. 5 shows an embodiment of electronics package 461 in accordance with the invention. The main supply buses are connected to terminals HI and N, indicating, for example, the hot lead and the neutral, respectively. Terminals HO and N indicate the connections to the outlet socket in housing 412 in the case of an automatic disconnector outlet. The connecting conductor between HI and HO passes through a magnetic core for forming the primary winding of a toroidal transformer T and a secondary winding is provided on the magnetic core, with terminals S1 and S2. Terminal S2 is coupled to terminal N. Terminal S1 is coupled to the anodes of diodes D1 and D2. The cathode of diode D2 is coupled by way of a resistor R2 to one pole of a capacitor C1, the other pole of C1 being coupled to terminal N. The cathode of diode D2 is coupled by way of a resistor R1 to one pole of a capacitor C2, the other pole of C2 being coupled to terminal N. A resistor R3 is coupled in shunt across C2. One end of solenoid 60 is coupled to terminal HI and the other end of solenoid 60 is coupled to the anode of a silicon controlled rectifier SCR or some other suitable controlled conduction device such as a thyristor, thyratron, transistor, opto-electronic switch or a relay, optionally by way of a series resistor R. The cathode of SCR is coupled to terminal N. A field effect transistor Q1, having a main conducting path and a control electrode for controlling current flow in the main conduction path has one end of its main conducting path coupled to the junction node of capacitor C1 and resistor R2 and the other end of its main conducting path coupled to the gate electrode of SCR. The control electrode of Q1 is coupled to the junction node of resistor R1 and capacitor C2.

In operation, when a load current flows through the primary winding of transformer T, capacitor C1 is charged by way of rectifier diode D2. Likewise, capacitor C2 is charged to a lower voltage determined by the ratio of resistors R1 and R3. The resistance of resistor R3 is such that the voltage across capacitor C2 does not drop appreciably during the negative or non-charging half-cycle of the supply voltage. The voltages across C1 and C2 are so arranged that transistor Q1 remains non-conductive. When the current through the primary winding of transformer T is interrupted, such as by switching off an appliance being supplied through the automatic disconnector outlet, capacitor C2 is rapidly discharged through resistor R3. Capacitor C1 remains charged. At a point where the falling voltage across C2 causes transistor Q1 to start conducting, the voltage across C1 is coupled to the gate electrode of the silicon controlled rectifies SCR, thereby causing it to fire and energize solenoid 60. The appliance plug is thereby ejected. Shortly thereafter, C1 will be further discharged by way of Q1 and the solenoid will be deenergized if it has not already been deenergized by the supply's having been disconnected.

Figure 6:
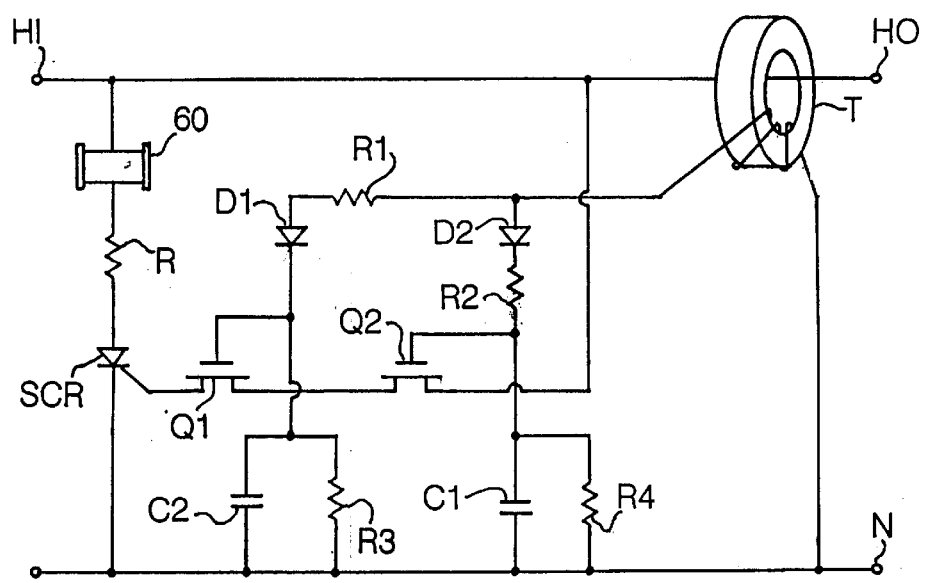

In the embodiment of FIG. 6, an additional transistor Q2 has its main conduction path coupled between terminal HI and that end of the main conduction path of Q1 which in the FIG. 5 embodiment is coupled to the junction node of C1 and R2. Accordingly, when SCR fires, its gate current is supplied from terminal HI by way of Q2, rather than from capacitor C1, which in this case supplies only the gate voltage for making Q2 conductive. A relatively high-valued resistor R4 in shunt with C1 provides for the eventual discharge of C1 for ending the supply of gate turn-on voltage to SCR after an appropriate interval of operation.

The present invention has been described by way of exemplary embodiments. Various changes and modifications will suggest themselves to one of skill in the art to which it pertains and changes of this sort are intended to be within the contemplation of the invention. For example, the various rocker configurations and the like are readily susceptible to change in form while preserving the essential function. Spiral springs may be replaced by cantilever springs or other biasing arrangements. Circuit arrangements for performing similar functions may be made somewhat differently from the actual exemplary configurations shown herein. Thus, for example, an electromechanical relay may used instead of the SCR.

Furthermore, the details of the actual release mechanism of actuator may be readily changed without departure from the concept disclosed herein. An external sleeve may be used in place of a pin. For example, a mechanism essentially like that disclosed in the afore-mentioned U.S. Pat. No. 5,211,569 issued May 18, 1993 in the name of Havens and entitled ELECTRICAL POWER CORD AND APPLIANCE USING SAME, or in U.S. Pat. No. 5,266,040, issued Nov. 30, 1993 in the names of Merrill et al., entitled RELEASABLE ELECTRIC CONNECTOR ASSEMBLY, may be substituted for the exemplary mechanism herein describe.

While the described embodiments utilize sliding plungers and actuators, it is readily seen that pivoted elements may be used with relatively minor mechanical redesign so that portion 28, for example, is mounted on a rotational member having corresponding arcuate cam portions and movements. In this case, a spiral spring can be substituted in place of illustrated spring 42.

Inversion of various parts as may pertain to a socket or a plug is also within the spirit of the invention.

These and other like changes and modifications are intended to be within the scope and spirit of the invention which is defined by the claims following.

We claim:

1. An electronic circuit arrangement for automatically providing an energizing current to a solenoid for causing ejection of a plug from an outlet upon substantial cessation of current flow being drawn by an appliance by way of said plug, said substantial cessation of current flow being caused by said appliance being switched off.

2. An electronic circuit arrangement in accordance with claim 1, wherein said energizing current is controlled by a controlled switching device.

3. An electronic circuit arrangement in accordance with claim 2, including sensing circuit means for sensing said substantial cessation of current flow for providing a trigger signal to said controlled switching device.

4. An electronic circuit arrangement in accordance with claim 3, including:

capacitor means for maintaining a charge at a time when said plug is engaged with said outlet; and transistor means coupled between a control electrode of said controlled switching device and said capacitor and being responsive to said substantial cessation of current flow for providing said trigger signal.

5. An electronic circuit arrangement in accordance with claim 4, including toroidal transformer means coupled to said capacitor means and to said transistor means.

6. In an arrangement for automatically disconnecting a plug from an outlet socket by use of a solenoid operating an ejector mechanism for separating said plug from said socket, an electronic circuit for providing an energizing current to said solenoid, said electronic circuit comprising:

means for providing a signal voltage representative of current flow through said plug to a load connected therewith;

first controllable conduction means coupled in series with said solenoid and having a trigger electrode;

capacitor means coupled to a supply source for charging said capacitor means with an operating voltage at a time when said current flow is not zero;

second controllable conduction means coupled between said capacitor means and said trigger electrode and having a control electrode; and control circuit means coupled between said means for providing a signal voltage and said control electrode.

7. An electronic circuit in accordance with claim 6, wherein said means for providing a signal voltage comprises a toroidal transformer.

8. An electronic circuit in accordance with claim 7, wherein said first controllable conduction means comprises one of an SCR and a thyristor.

9. An electronic circuit in accordance with claim 8, wherein said control circuit means comprises a time constant circuit having a faster time constant than a time constant associated with said capacitor means.

10. An electronic circuit in accordance with claim 8, wherein said control circuit means comprises a current source and a timing capacitor charged from said current source when said current flow is not zero, said timing capacitor discharging more rapidly than said capacitor means when said current flow ceases, thereby causing a turn-on signal to be applied to said control electrode of said second controllable conduction means for causing said operating voltage of said capacitor means to be applied to said trigger electrode by way of said second controllable conduction means.

11. An electronic circuit for providing a trigger signal to a controlled conduction device upon cessation of current flow in a monitored circuit, comprising:
    means for providing a monitoring signal representative of said current flow; and
    means for sensing said monitoring signal and for providing said trigger signal when said monitoring signal indicates a substantial cessation of said current flow caused by said appliance being switched off.

12. An electronic circuit in accordance with claim 11, wherein said means for providing a monitoring signal representative of said current flow comprises a toroidal transformer.

13. An electronic circuit in accordance with claim 12, wherein said means for sensing said monitoring signal includes capacitor storage means for providing operating power and energy for said trigger signal.

14. An electronic circuit in accordance with claim 12, wherein current for said trigger signal is obtained by way of a coupling to said monitored circuit.

15. An electronic circuit for controlling apparatus for unplugging a plug from an outlet socket, comprising:
    a solenoid for operating a mechanical armature arrangement for physically separating said plug from said socket;
    controllable conduction means for selectively energizing said solenoid;
    means for sensing current flow to a load through said plug; and
    detecting means coupled to said sensing means for detecting a substantial cessation of said current flow caused by said load being switched off and thereupon supplying a trigger signal to said controllable conduction means for energizing said solenoid.

16. An electronic circuit in accordance with claim 15, including capacitive storage means for providing operating power to said detecting means.

17. An electronic circuit in accordance with claim 15, including means for sensing the presence of a plug where said plug optionally exhibits a keying element, such that said detecting means is disabled unless said plug does exhibit said keying element.

18. An electronic circuit in accordance with claim 17, wherein said keying element comprises a protuberance and said means for sensing the presence comprises a switch, said switch being actuated by said protuberance upon insertion of said plug into said socket.

19. An electronic circuit in accordance with claim 15, wherein said detecting means supplies said trigger signal after detecting a substantial cessation of said current flow independently of whether said current flow is established before, concurrently with, or after insertion of said plug into said socket.

20. An electronic circuit in accordance with claim 19, wherein said electronic circuit is formed, in part at least, as an integrated circuit.

21. An electronic circuit for controlling apparatus for unplugging a plug from an outlet socket, comprising:
    a solenoid for operating a mechanical armature arrangement for physically separating said plug from said socket;
    controllable conduction means for selectively energizing said solenoid;
    means for sensing current flow to a load through said plug;
    detecting means coupled to said sensing means for detecting a substantial cessation of said current flow and thereupon supplying a trigger signal to said controllable conduction means for energizing said solenoid; and
    means for sensing the presence of a plug where said plug optionally exhibits a keying element, such that said detecting means is disabled unless said plug does exhibit said keying element.

22. An electronic circuit in accordance with claim 21, wherein said keying element comprises a protuberance and said means for sensing the presence comprises a switch, said switch being actuated by said protuberance upon insertion of said plug into said socket.

23. An electronic circuit in accordance with claim 21, including capacitive storage means for providing operating power to said detecting means.

24. An electronic circuit in accordance with claim 21, wherein said detecting means supplies said trigger signal after detecting a substantial cessation of said current flow independently of whether said current flow is established before, concurrently with, or after insertion of said plug into said socket.

25. An electronic circuit in accordance with claim 21, wherein said electronic circuit is formed, in part at least, as an integrated circuit.

26. An electronic circuit arrangement for automatically providing an energizing current to a solenoid for ejecting a plug from an outlet connected to an electric supply voltage, upon substantial cessation of current flow being drawn by an appliance by way of said plug while said electric supply voltage is present.

27. An electronic circuit arrangement in accordance with claim 26, wherein said energizing current is controlled by a controlled switching device.

28. An electronic circuit arrangement in accordance with claim 27, including sensing circuit means for sensing said substantial cessation of current flow for providing a trigger signal to said controlled switching device.

29. An electronic circuit arrangement in accordance with claim 27, including:
    capacitor means for maintaining a charge at a time when said plug is engaged with said outlet; and
    transistor means coupled between a control electrode of said controlled switching device and said capacitor and being responsive to said substantial cessation of current flow for providing said trigger signal.

30. An electronic circuit arrangement in accordance with claim 27, including toroidal transformer means coupled to said capacitor means and to said transistor means.

31. An electronic circuit for providing a trigger signal to a controlled conduction device upon cessation of supply current flow being drawn by a load in a monitored circuit, said monitored circuit being coupled to a source of supply voltage, comprising:

means for providing a monitoring signal representative of said current flow; and means for sensing said monitoring signal and for providing said trigger signal when said monitoring signal indicates a substantial cessation of said current flow while said source of supply voltage is present.

32. An electronic circuit in accordance with claim 31, wherein said means for providing a monitoring signal representative of said current flow comprises a toroidal transformer.

33. An electronic circuit in accordance with claim 32, wherein said means for sensing said monitoring signal includes capacitor storage means for providing operating power and energy for said trigger signal.

34. An electronic circuit in accordance with claim 32, wherein current for said trigger signal is obtained by way of a coupling to said monitored circuit.

35. An electronic circuit for controlling apparatus for unplugging a plug from an outlet socket coupled to a source of supply voltage, comprising:

a solenoid for operating a mechanical armature arrangement for physically separating said plug from said socket;

controllable conduction means for selectively energizing said solenoid;

means for sensing supply current flow being drawn by a load through said plug; and detecting means coupled to said sensing means for detecting a substantial cessation of said current flow while said supply voltage is present and thereupon supplying a trigger signal to said controllable conduction means for energizing said solenoid.

36. An electronic circuit in accordance with claim 35, including capacitive storage means for providing operating power to said detecting means.

37. An electronic circuit in accordance with claim 35, including means for sensing the presence of a plug where said plug optionally exhibits a keying element, such that said detecting means is disabled unless said plug does exhibit said keying element.

38. An electronic circuit in accordance with claim 37, wherein said keying element comprises a protuberance and said means for sensing the presence comprises a switch, said switch being actuated by said protuberance upon insertion of said plug into said socket.

39. An electronic circuit in accordance with claim 35, wherein said detecting means supplies said trigger signal after detecting a substantial cessation of said current flow independently of whether said current flow is established before, concurrently with, or after insertion of said plug into said socket.

40. An electronic circuit in accordance with claim 39, wherein said electronic circuit is formed, in part at least, as an integrated circuit.

* * * * *